United States Patent [19]

Hooker et al.

[11] 4,202,224
[45] May 13, 1980

[54] APPARATUS FOR ROTATING OF TRACK BUSHING BY COMBINED STATIC AND DYNAMIC TORQUE

[75] Inventors: James A. Hooker; Dean W. Martin; Shellie O. Williamson, all of Peoria, Ill.

[73] Assignee: Caterpillar Tractor Co., Peoria, Ill.

[21] Appl. No.: 909,148

[22] Filed: May 24, 1978

[51] Int. Cl.² .......................... B25B 9/00; B25B 13/48
[52] U.S. Cl. .................................... 81/3 R; 29/DIG. 46
[58] Field of Search ................... 81/3 R, 53 R, 57.32, 81/57.33; 29/DIG. 46

[56] References Cited
U.S. PATENT DOCUMENTS

| 3,890,697 | 6/1975 | Horioka | 29/DIG. 46 |
| 3,915,036 | 10/1975 | Valandingham et al. | 81/3 R |
| 4,002,090 | 1/1977 | Valandingham et al. | 81/3 R |

*Primary Examiner*—James G. Smith
*Attorney, Agent, or Firm*—Phillips, Moore, Weissenberger, Lempio & Majestic

[57] ABSTRACT

For use in rotating a bushing of an assembled track, wherein the bushing is press-fitted into apertures of a pair of links, first and second members are securable to one and the other of such pair of links, and a rapidly extendable and retractable cylinder interconnects the first and second members for providing a vibratory motion which, for optimum results, should be at resonant frequency to the links while rotational torque is being applied to such bushing.

7 Claims, 3 Drawing Figures

APPARATUS FOR ROTATING OF TRACK BUSHING BY COMBINED STATIC AND DYNAMIC TORQUE

BACKGROUND OF THE INVENTION

This invention relates to the turning of the bushings of a track of a track-type vehicle, and more particularly, to such turning of bushings with a track in a fully assembled state on the vehicle.

Commonly used track chains for earthmoving vehicles comprise a plurality of track links. The track links are connected into two parallel endless chains by means of track link hinge joints having track pins joining the ends of adjacent pairs of links and spanning the space between the parallel chains. Drive sprockets drive the track chains and provide locomotion for the vehicle by acting against bushings upon the track pins.

For efficient and low cost operation, it is, of course, desirable to construct a track chain in a manner to provide for a long, trouble-free operating life. All track parts are subject to a high rate of wear because of the service they perform and the environment in which they operate. Recent developments in seals and lubrication methods promise to increase the life of some track parts measurably and it appears that the track pin bushing in its present form may well continue to be the first element of the track to require maintenance.

Force for driving the tracks by sprocket is received upon a given portion of the bushing. Additionally, as each bushing comes into engagement with or tends to be disengaged from the sprocket, there is relative pivotal motion between the two adjacent links. Since the bushing is conventionally secured to one of these links, it is caused to rotate while in engagement with the sprocket. The rotation of the bushing against the sprocket is commonly referred to as "scrubbing" and causes substantial abrasion of the bushing.

U.S. Pat. No. 3,915,036, issued Oct. 28, 1975 in the name of Vanlandingham et al (assigned to the assignee of this invention) discloses apparatus for rotating the bushings of an assembled track in place on a tractor to present new bushing wear areas to the sprocket which engages these bushings. With such apparatus, rotative torgue is applied to a clamp member in engagement with a bushing, to so rotate the bushing.

While such a system is highly effective for so turning such bushings, it will be understood that an increase in efficiency thereof, including a reduction in the time and force necessary to so turn such bushings, through the more efficient use of rotational force applied thereto, is highly desirable.

SUMMARY OF THE INVENTION

The present invention is directed to overcoming one or more of the problems as set forth above.

According to the present invention, such invention comprises apparatus for providing dynamic torque multiplication to a pair of links of a track of a vehicle, the track being of the type wherein links are connected by track pins and bushings. The apparatus comprises a first member securable to one of a pair of track links, a second member securable to the other of that pair of track links, and means interconnecting the first and second members for providing a vibration preferably at resonant frequency of the track link assembly therebetween.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
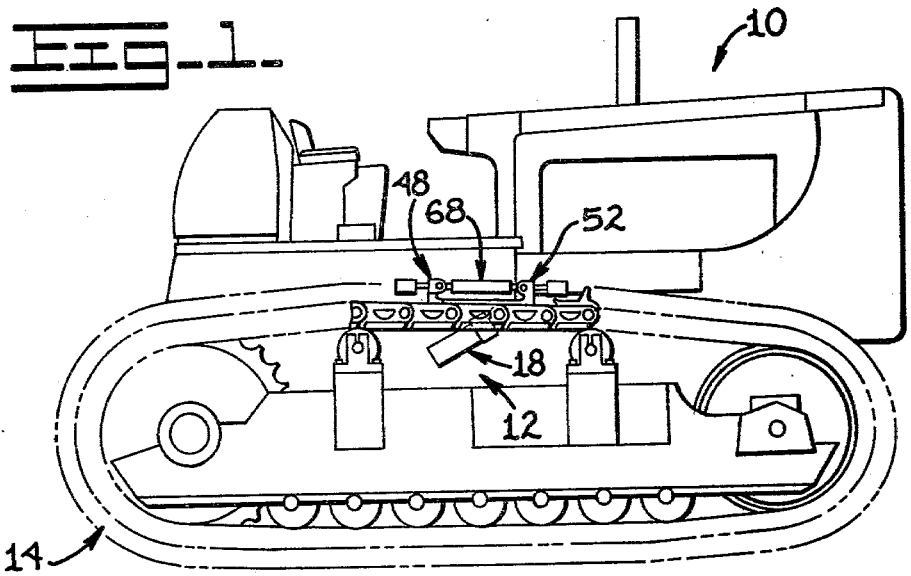
FIG. 1 is a side elevation of a track-type vehicle incorporating the invention.
Figure 2:
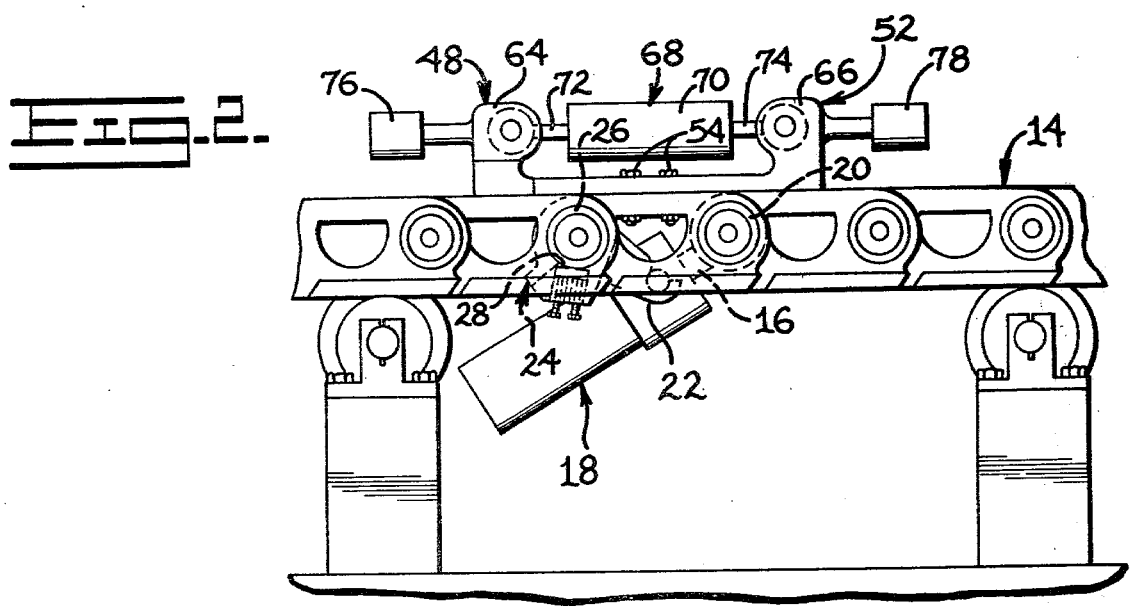
FIG. 2 is an enlarged view of a portion of the apparatus as shown in FIG. 1.

Shown in FIG. 1 is a track-type vehicle 10 which utilizes an apparatus 12 interconnecting adjacent track bushings of a track 14 of the vehicle, with the track 14 in place and fully assembled. This apparatus 12 is in accordance with that shown in FIG. 5 of the above-cited U.S. Pat. No. 3,915,036, and described in the specification therein. In general, such apparatus 12 is disposed inwardly of the track 14, with the rod end 16 of the cylinder or jack 18 thereof engaging with a bushing 20. The extension of such jack 18 pivots an arm 22 affixed to clamp means 24 which are in turn associated with the bushing 26. An insert 28 slidably mounted to the clamp means 24 is seated in the worn area of the bushing 26. It will be seen that through extension of the jack 18, the bushing 26 may be turned to rotate such bushing 26, with the track 14 in its fully assembled state.

Figure 3:
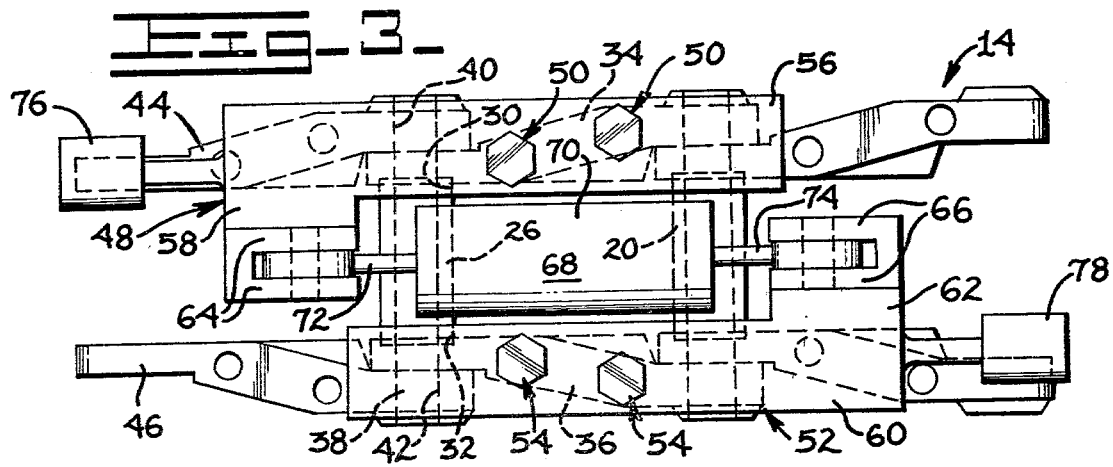
FIG. 3 is an enlarged plan view of a portion of the apparatus as shown in FIG. 2.

It is to be remembered that each bushing, i.e., for example, bushing 26 shown in FIG. 3, is press-fitted into bores 30,32 of the respective adjacent ends of links 34,36. A pin 38 is movably disposed within such bushing 26, and has the ends thereof press-fitted into bores 40,42 defined by the respective associated links 44,46, so that the links 34,36 are pivotally mounted relative to the links 44,46.

To aid in the rotation of, for example, the bushing 26, a first member 48 is secured to the link 34 by means of bolts and nuts 50, and a second member 52 is secured to the link 36 by means of bolts and nuts 54, these links 34,36 being in generally side-by-side relation so that the members 48,52 are in generally side-by-side relation. The member 48 is made up of an elongated main member portion 56 running generally along the link 34, and a limb 58 extending therefrom in perpendicular fashion, so as to be generally L-shaped in configuration. Likewise, the member 52 is made up of an elongated main member portion 60 positioned generally along the link 36, and a limb 62 extending therefrom and generally perpendicular thereto, so as to be generally L-shaped in configuration. The limbs 58,62 are in opposed relation, and upwardly directed ears 64 extend from the limb 58, and upwardly directed ears 66 extend from the limb 62. A cylinder apparatus 68 interconnects the ears 64,66, in turn fixed to the limbs 58,62, so that the cylinder apparatus 68 in the broad sense interconnects the limbs 58,62 of the members 48,52. The apparatus 68 includes a body 70 and extendable and retractable rods 72,74 which are actually pivotally secured to the respective ears 64,66. Upon extension of the rods 72,74 from the body 70, it will be seen that one of the links 34,36 tends to rock relative to the other through the force applied to the members 48,52. Similarly, retraction of the rods 72,74 tends to pivot the links 34,36 relatively oppositely through pivoting of the members 48,52. Masses 76 and 78 are secured to each of members 48 and 52, respectively, and are used to tune the natural frequency of the system to a frequency that is within a range that is low enough to be attained through the excitement of the cylinder apparatus 68. Thus, it will be seen that through cyclic extension and retraction of the cylinder assembly 68, at the resonant frequency of the system, a resonant occurs between the links 34,36 imposing a dynamic torque multiplication between the links that drastically reduces the static torque required to rotate the bushing. While such resonant of the pair of links 34,36 is taking place, a rotational force is applied to the bushing 26 interconnecting the links 34,36. The cyclic force applied to links 34,36 to which the bushing 26 is press-fitted, aids in achieving rotation of the bushing 26 in a highly effective manner by increasing the applied energy and reducing the friction at the points of connection.

The embodiments of the invention in which an exclusive property or privilege is claimed are defined as follows:

1. Apparatus for rotating a track pin bushing, the track being of the type wherein links are connected on one end by track pins and on the other end by bushings, said apparatus comprising:
   a first member securable to one of a pair of track links;
   a second member securable to the other of that pair of track links;
   exciter means interconnecting the first and second members for providing a vibratory motion therebetween; and
   means for applying a rotational force to said bushing.

2. The apparatus of claim 1 wherein said exciter means is operative to provide a substantially resonant vibratory motion.

3. The apparatus of claim 2 wherein the exciter means comprises extendable and retractable cylinder means.

4. The apparatus of claim 1 wherein said means for applying a rotational force to said bushing operates concurrently with the application of vibratory motion by said exciter means.

5. The apparatus of claim 2 including structure having required mass connected to said track links to tune the system so that said exciter means can attain resonant vibration.

6. The apparatus of claim 1 wherein each of the first and second members comprise a main member portion and a limb extending therefrom, so as to be generally L-shaped in configuration, the first and second members being securable to one and the other links in generally side-by-side relation, the exciter means interconnecting the first and second members comprising extendable and retractable cylinder means interconnecting the limbs of the respective first and second members.

7. In a method for rotating a bushing of a track of a vehicle, wherein the bushing interconnects a pair of links of the track, including the steps of:
   vibrating the bushing; and
   applying rotational force to the bushing to rotate the bushing while said bushing is being vibrated;
   the improvement comprising the steps of:
   interconnecting said links with a vibrator; and
   providing a vibration between the pair of links to vibrate said bushing.

* * * * *